United States Patent
Chapman et al.

(10) Patent No.: US 11,582,010 B2
(45) Date of Patent: Feb. 14, 2023

(54) METHOD FOR DETERMINING SPECTRUM UTILIZATION

(71) Applicant: Telefonaktiebolaget LM Ericsson (publ), Stockholm (SE)

(72) Inventors: Thomas Chapman, Solna (SE); Farshid Ghasemzadeh, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 792 days.

(21) Appl. No.: 16/330,250

(22) PCT Filed: Aug. 15, 2018

(86) PCT No.: PCT/EP2018/072101
§ 371 (c)(1),
(2) Date: Mar. 4, 2019

(87) PCT Pub. No.: WO2019/048199
PCT Pub. Date: Mar. 14, 2019

(65) Prior Publication Data
US 2021/0359825 A1    Nov. 18, 2021

Related U.S. Application Data
(60) Provisional application No. 62/556,680, filed on Sep. 11, 2017.

(51) Int. Cl.
H04L 5/00    (2006.01)
H04W 72/04    (2023.01)
(Continued)

(52) U.S. Cl.
CPC ........... *H04L 5/0058* (2013.01); *H04W 72/04* (2013.01); *H04L 27/26025* (2021.01); *H04W 72/044* (2013.01)

(58) Field of Classification Search
CPC ............... H04L 5/0058; H04L 27/2602; H04L 27/26025; H04W 72/04; H04W 72/044; H04W 72/1257
See application file for complete search history.

(56) References Cited

U.S. PATENT DOCUMENTS
2016/0294498 A1    10/2016    Ma et al.
2017/0188347 A1    6/2017    Chen et al.
(Continued)

OTHER PUBLICATIONS
3GPP TSG-RAN WG4 #83; Hangzhou, China; Source: Ericsson; Title: Further elaboration on multiple numerologies (R4-1704949)—May 15-19, 2017.
(Continued)

*Primary Examiner* — Faruk Hamza
*Assistant Examiner* — Aixa A Guadalupe Cruz
(74) *Attorney, Agent, or Firm* — Baker Botts, LLP

(57) ABSTRACT

According to certain embodiments, a method in a network node (100A) for determining spectrum utilization for a plurality of numerologies transmitted within an allocated bandwidth includes selecting one or more of the plurality of numerologies. For each of the one or more selected numerologies, a spectrum utilization is determined. The spectrum utilization is based on the spectrum utilization that would be achieved if the selected numerology was transmitted across the allocated bandwidth. A physical resource block (PRB) allocation is calculated based on the allocated bandwidth and the spectrum utilization.

20 Claims, 12 Drawing Sheets

(51) Int. Cl.
*H04W 72/044* (2023.01)
*H04L 27/26* (2006.01)

(56) References Cited

U.S. PATENT DOCUMENTS

| | | | | |
|---|---|---|---|---|
| 2017/0215170 | A1* | 7/2017 | Islam | H04W 72/04 |
| 2018/0048435 | A1* | 2/2018 | Islam | H04L 5/0007 |
| 2018/0092086 | A1* | 3/2018 | Nammi | H04L 5/0069 |
| 2018/0109406 | A1* | 4/2018 | Wang | H04L 5/0007 |
| 2019/0229867 | A1* | 7/2019 | Yi | H04L 5/0048 |
| 2019/0357239 | A1* | 11/2019 | Moon | H04L 5/0094 |
| 2021/0288856 | A1* | 9/2021 | Liu | H04L 27/26025 |

OTHER PUBLICATIONS

3GPP TSG-RAN WG4 Meeting #84; Berlin, Germany; Source: Intel Corporation; Title: NR spectrum utilization (R4-1707389)—Aug. 21-25, 2017.
PCT Notification of Transmittal of the International Search Report and Teh Written Opinion of the International Searching Authority, or the Declaration—International application No. PCT/EP2018/072101—dated Nov. 6, 2018.
3GPP TSG-RAN WG4 #84; Berlin, Germany; Agenda 9.3.3—Way Forward On Spectrum Utilization (R4-1708852)—Aug. 21-25, 2017.
Japanese Notice of Reasons for Rejection issued for Patent Application No. 2020-514545—dated Jul. 13, 2021.
Office Action from Chinese Patent Office in Application No. 201880067007.1 dated Jan. 26, 2022 (not translated).
3GPP TSG-RAN WG4 #84 Meeting, R4-1707186, ZTE, "NR spectrum utilization of single numerology case for sub-6GHz," Aug. 21-25, 2017.
3GPP TSG-RAN WG1 Meeting #87, R1-1612446, Samsung, "Guard band Considering Channel Bandwidth for Mixed Numerologies," Nov. 14-18, 2016.
3GPP TSG-RAN WG4 NR AH#3 Meeting, R4-1709327, ZTE, "Further discussion on NR spectrum utilization of single numerology case for sub-6GHz," Sep. 18-21, 2017.
"Spectrum utilization," Ericsson, 3GPP TSG-RAN WG4 #84, R4-1708107, Berlin, Germany, Aug. 21-25, 2017.
"On spectrum utilization for 25 MHz BW," Ericsson, 3GPP TSG-RAN WG4 #84, R4-1708122, Berlin, Germany, Aug. 21-25, 2017.

* cited by examiner

METHOD FOR DETERMINING SPECTRUM UTILIZATION

PRIORITY

This nonprovisional application is a U.S. National Stage Filing under 35 U.S.C. § 371 of International Patent Application Serial No. PCT/EP20181072101 filed Aug. 15, 2018 and entitled "Method for Determining Spectrum Utilization" which claims priority to U.S. Provisional Patent Application No. 62/556,680 filed Sep. 11, 2017 both of which are hereby incorporated by reference in their entirety.

TECHNICAL AREA

Embodiments of the present disclosure relate generally to determining spectrum utilization.

BACKGROUND

3GPP is currently developing a new Radio Access Technology (RAT), known as new radio (NR), that will be the basis of 5G and be submitted to IMT-2020. NR aims to fulfil a number of goals, including improving spectral efficiency, reducing latency, and enabling new use cases for IMT (International Mobile Telecommunications) technology.

In particular, NR is expected to enable a wider range of use cases than predecessor cellular radio technologies. Potential use cases include MRR (Mobile Broadband), Ultra Reliable Low Latency Communication (URLLC). Machine Type Communication (MTC), Device-to-Device (D2D), Vehicle-to-Vehicle & Vehicle-to-Infrastructure Communication (V2V & V2X).

The NR air interface will be based on Orthogonal Frequency Division Multiplexing (OFDM). When developing an OFDM waveform specification, two interrelated and key parameters are the subcarrier spacing in the frequency domain and the symbol length. As illustrated in FIG. 1, for F-UTRA the subcarrier spacing is fixed at 15 kHz and the symbol length (minus cyclic prefix) at 66.7 μsec, see for example 3GPP TS 36.201 V14.1.0 (201743-23) For NR, there will not just be one possibility for subcarrier spacing, but a plurality. The subcarrier spacing possibilities will be based on $15*2^n$ kHz, where n may be 1, 2, 3 ... or potentially 0.5 or 0.25. See 3GPP TR 38.804 V14.0.0 (2017-03-24).

There are several reasons for allowing multiple possibilities for subcarrier spacing. First, NR is expected to operate in a diverse range of spectrum, ranging from spectrum at less than 1 GHz up to several tens of GHz. The needed subcarrier spacing depends upon phase noise experienced in the transmitter and receiver, and the amount of phase noise depends on the frequency range. Thus, different subcarrier spacings are needed for different parts of the frequency range. A second reason for allowing for different possibilities for subcarrier spacing is that the symbol length is directly related to the subcarrier spacing. The wider the subcarrier spacing, the shorter the symbol length. FIG. 2 illustrates example NR subcarrier spacing and symbol duration possibilities.

For some applications, such as URLLC, latency is critical and, thus, a larger subcarrier spacing—and the associated shorter sub-frame length—are necessary. For other applications, such as MBB, spectral efficiency is critical and the subcarrier spacing needs to be set to minimize phase noise and the overhead from the cyclic prefix (CP), which leads to wider sub-frame spacing.

There is a potential for using wider sub-carrier spacing for some types of physical channels such as, for example, for transmission of broadcast and synchronization compared to subcarrier spacing used for data. If a base station or UE is transmitting or receiving different types of service, it may be that different subcarrier spacings are appropriate for each service. To enable optimized multi-service transmission, 3GPP is considering including in the 5G specifications the possibility of transmitting two different numerologies within the same frequency allocation for either the base station, the UE, or both. The decision as to how much of the carrier to allocate to each numerology may be made by the base station and changed frequently. FIG. 3 illustrates an example of transmitting different numerologies.

In order to achieve the goal of increasing spectral efficiency, 3GPP has agreed to increase the spectral utilization for NR. For previous RATs such as UTRA or E-UTRA, the so-called spectral utilization has been fixed at 90%. This means that if a bandwidth of X is allocated for transmissions, only 90% of X is used for transmissions. The remaining 10% of the spectrum is unused. As illustrated by FIG. 4A, 5% of the spectrum is typically left unused on either side of the bandwidth.

As illustrated by FIG. 4B, the restriction of spectral utilization to 90% leaves space available in the frequency domain for the roll-off of a filtering or windowing technique that avoid interference from one carrier to the next carrier. In this way, bandwidth allocations for different operators will not cause interference to one another.

For NR, it has been recognized that in many cases, the amount of unused bandwidth needed for filtering/windowing of the unwanted emissions can be lower than 5% on either side of the carrier. This enables greater than 90% of the bandwidth to be used for transmitting user data, while filtering or windowing techniques can still be used to ensure that unwanted emissions outside of the edge of the allocated bandwidth meet unwanted emissions limits. It is not the case, however, that a generic spectrum utilization percentage can be allocated to NR in the same manner as E-UTRA or UTRA. This is because the amount of space in the frequency domain needed for filtering/windowing of the signal depends on that size of the allocated bandwidth and also on the subcarrier spacing used for transmission.

SUMMARY

There is a need for improved spectrum utilization in wireless communication networks to transmit different numerologies on the same carrier. It is an object of the present application how to decide the spectrum utilization for the allocated bandwidth with respect to each numerology when multiplexing more than one numerology in single channel bandwidth or bandwidth allocation. Embodiments of the present disclosure provide systems and methods for setting a required spectrum utilization for a base station that can flexibly allocate different numerologies within an allocated bandwidth.

Advantages provided by at least some of the embodiments disclosed are that multiple numerologies may be multiplexed within the same allocated bandwidth or part thereof, and in some examples within the same symbol. This provides flexible resource utilization in an efficient and interoperable manner with controlled intercarrier interference. Embodiments provide for simplified filter design when implemented multiple numerologies multiplexed within a single channel bandwidth or within the same symbol.

According to certain embodiments, a method for determining spectrum utilization for a plurality of numerologies transmitted within an allocated bandwidth includes selecting one or more of the plurality of numerologies. For each of the one or more selected numerologies, a spectrum utilization is determined. The spectrum utilization is based on the spectrum utilization that would be achieved if the selected numerology was transmitted across the allocated bandwidth. A physical resource block (PRB) allocation is calculated based on the allocated bandwidth and the spectrum utilization.

According to certain embodiments the above method is performed by a network node, e.g. an eNodeB or a gNB.

According to other embodiments the above method is performed by a wireless device, e.g a UE.

According to certain embodiments, an apparatus is provided for determining spectrum utilization for a plurality of numerologies transmitted within an allocated bandwidth. The apparatus includes processing circuitry configured to select one or more of the plurality of numerologies and, for each of the one or more selected numerologies, determine a spectrum utilization/ The spectrum utilization is based on the spectrum utilization that would be achieved if the selected numerology was transmitted across the allocated bandwidth. A physical resource block (PRB) allocation is calculated based on the allocated bandwidth and the spectrum utilization.

According to certain embodiments the above apparatus comprises a network node, e.g. an eNodeB or a gNB.

According to other embodiments the above apparatus comprises a wireless device, e.g a UE.

According to certain embodiments a computer program product in the form of storage (113, 103) comprising a non-transitory computer readable medium storing computer readable program code is provided, the computer readable program code operable, when executed by an apparatus, to perform the method described above.

Certain embodiments of the present disclosure may provide one or more technical advantages. For example, certain embodiments may provide a generic mechanism for deciding spectrum utilization and PRB allocation for different combinations of numerologies transmitted within an allocated bandwidth and, therefore, may enable standardization of flexible spectrum utilization. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
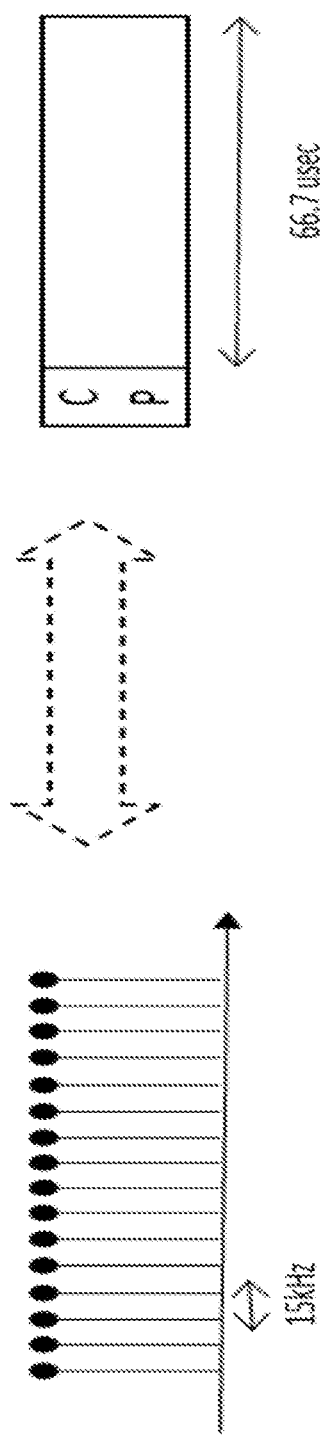
FIG. 1 is an example of LTE subcarrier spacing and symbol duration, according to certain embodiments.
Figure 2:
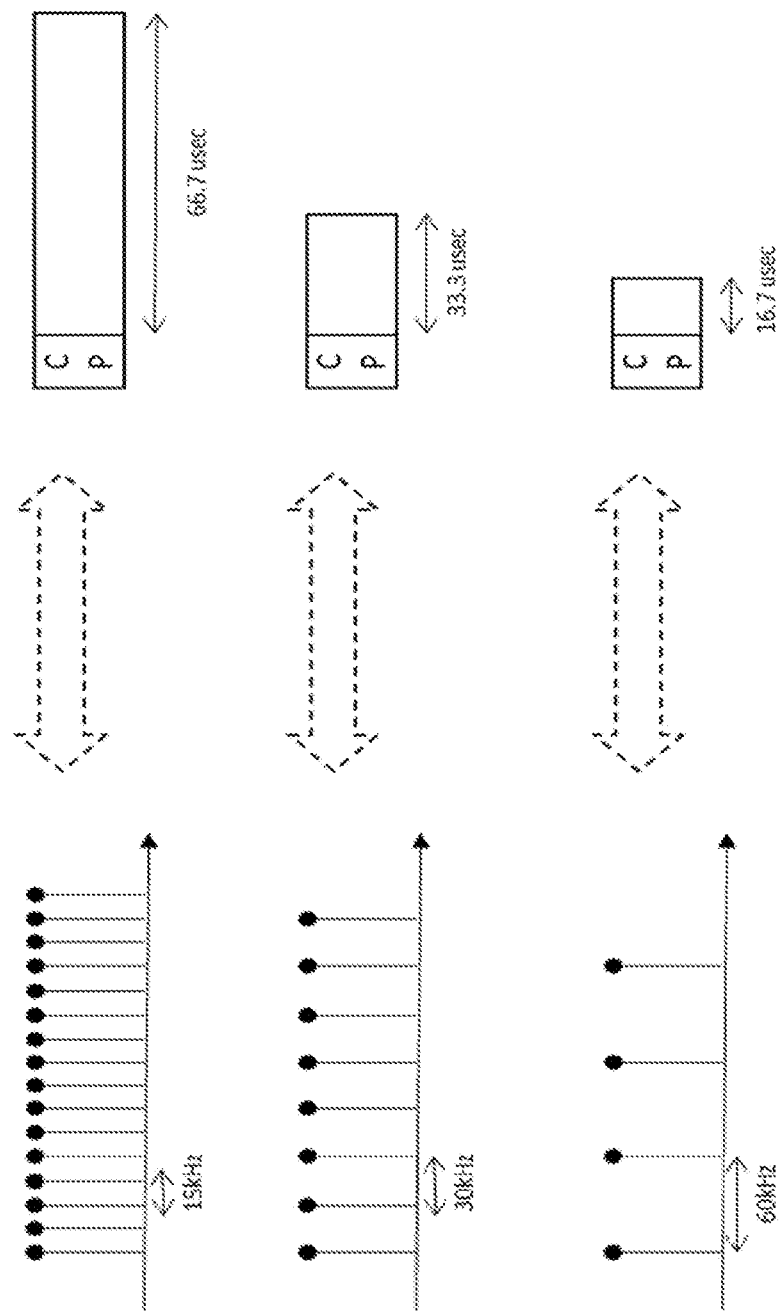
FIG. 2 is potential NR subcarrier spacing and symbol duration possibilities with different numerologies, according to certain embodiments.
Figure 3:
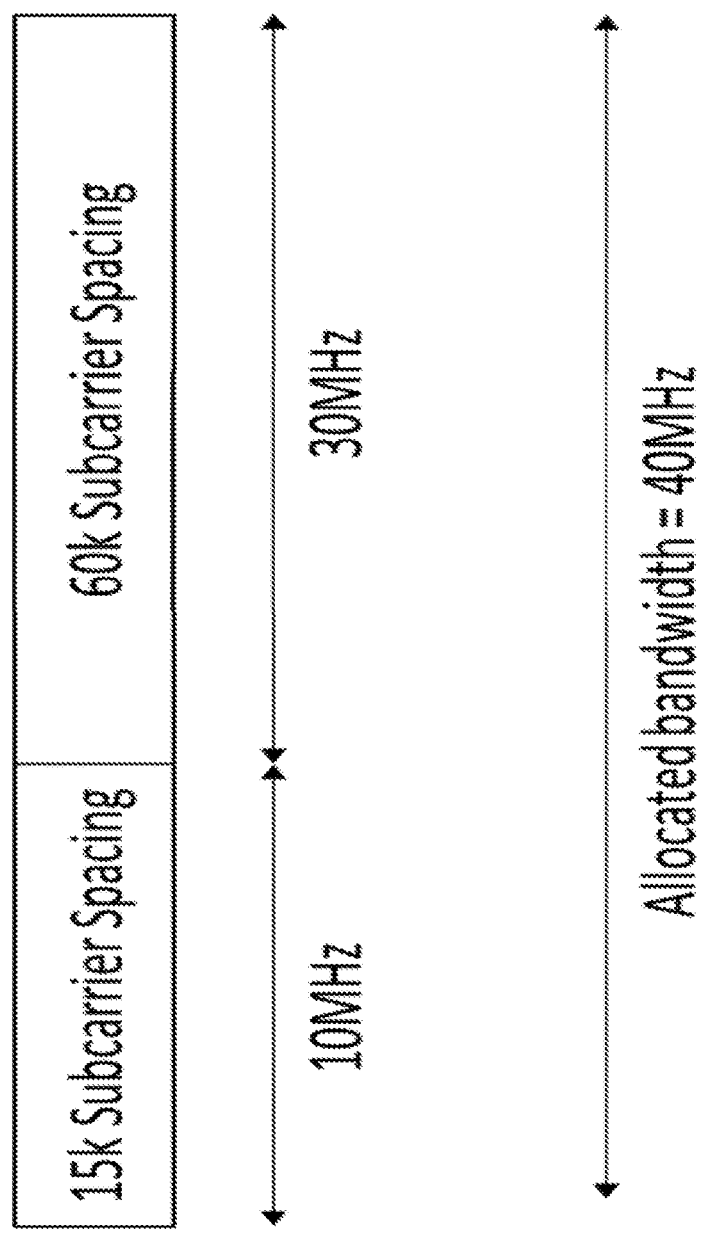
FIG. 3 is an example of transmitting different numerologies within an allocated bandwidth, according to certain embodiments.
Figure 4A:
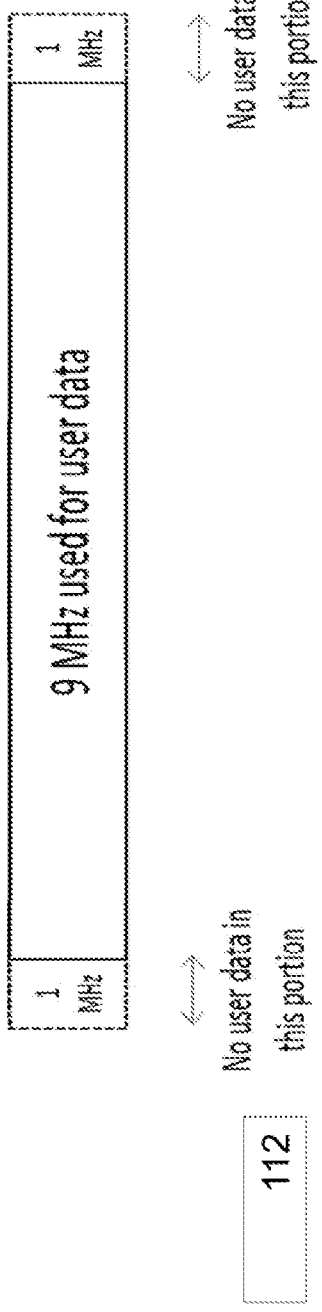
FIG. 4A is an example of E-UTRA spectrum utilization, according to certain embodiments.
Figure 4B:
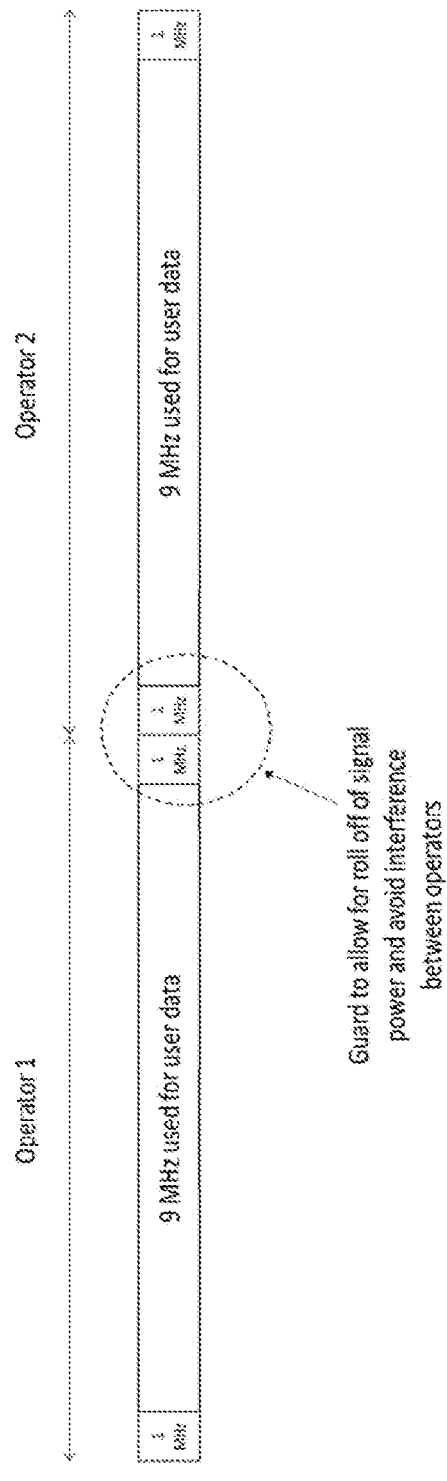
FIG. 4B is an example guard between operators with E-UTRA, according to certain embodiments.

As explained above, there is a need for improved spectrum utilization in wireless communication networks. Yet, there are a number of technical issues associated with spectrum utilization. The existing 3GPP decisions and solutions for spectrum utilization are based on the assumption of a single numerology being applied across the whole of the transmitted bandwidth. However, as described above, it is also intended that the base station should be able to transmit different numerologies on the same carrier. If different numerologies are transmitted, it is currently not clear how to decide the spectrum utilization for the allocated bandwidth.

As shown below in Tables 1 and 2, possible values for the usable number of Physical Resource Blocks (PRBs) for a number of specific bandwidth/Subcarrier Spacing combinations are depicted:

TABLE 1

Spectral Occupancy for range 1 (>24 GHz)

| SCS [kHz] | Channel BW [MHz] | | | | | | | | | |
|---|---|---|---|---|---|---|---|---|---|---|
| | 5 MHz $N_{RB}$ | 10 MHz $N_{RB}$ | 15 MHz $N_{RB}$ | 20 MHz $N_{RB}$ | 25 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
| 15 | 25 | 52 | 79 | 106 | 133 | 216 | 270 | N.A | N.A | N.A |
| 30 | 11 | 24 | 38 | 51 | 65 | 106 | 133 | 162 | 217 | 273 |
| 60 | N.A | 11 | 18 | 24 | 31 | 51 | 65 | 79 | 107 | 135 |

TABLE 2

Spectral Occupancy for range 2 (>24 GHz)

| | Channel BW [MHz] | | | |
|---|---|---|---|---|
| SCS [kHz] | 50 MHz $N_{RB}$ | 100 MHz $N_{RB}$ | 200 MHz $N_{RB}$ | 400 MHz $N_{RB}$ |
| 60 | 66 | 132 | 264 | N.A |
| 120 | 32 | 66 | 132 | 264 |

Furthermore, the base station may adapt the amount of different numerologies that are transmitted and the bandwidth allocated to each numerology on a dynamic basis. This means that there could be an enormous set of combinations of allocations of different numerologies. For each combination, a spectrum utilization target is needed. The spectrum utilization target cannot be read from the existing 3GPP spectrum utilization agreements for a single numerology. A utilization target is needed so that the unwanted emissions requirements can be defined and met under specific conditions. Furthermore, the spectrum utilization will impact the amount of filtering needed for receiver ACS. The spectrum utilization target needs to ensure that regardless of the configuration of numerologies, the filtering needed is even on either side of the carrier in order not to give rise to complex filter designs.

According to certain embodiments, a solution is provided that considers the percentage spectrum utilization that would be applied for each of the involved numerologies if it would be transmitted in isolation across the whole carrier. One of these numerologies and spectral utilization values may then be identified as the basis for deciding the spectral utilization for the whole carrier. Based on the identified spectral utilization for the whole carrier and the bandwidth allocated for each individual numerology, Physical Resource Block (PRB) utilization values are then allocated to each numerology, taking into account that PRB bandwidths for different numerologies will have different values and the overall percentage spectrum utilization should be achieved.

According to certain particular embodiments, the two numerologies that are transmitted at the two edges of the carrier may be considered. The numerology with the lowest spectrum utilization percentage is identified and is used as the spectrum utilization for the whole carrier. At either edge of the carrier, PRBs are allocated such that the identified percentage spectrum utilization is achieved. Advantages provided by at least some of the embodiments disclosed are that multiple numerologies may be multiplexed within the same channel bandwidth and in some examples within the same symbol. This provides flexible resource utilization in an efficient and interoperable manner with controlled inter-carrier interference. Embodiments provide for simplified filter design when implemented multiple numerologies multiplexed within a single channel bandwidth or within the same symbol.

Figure 5:
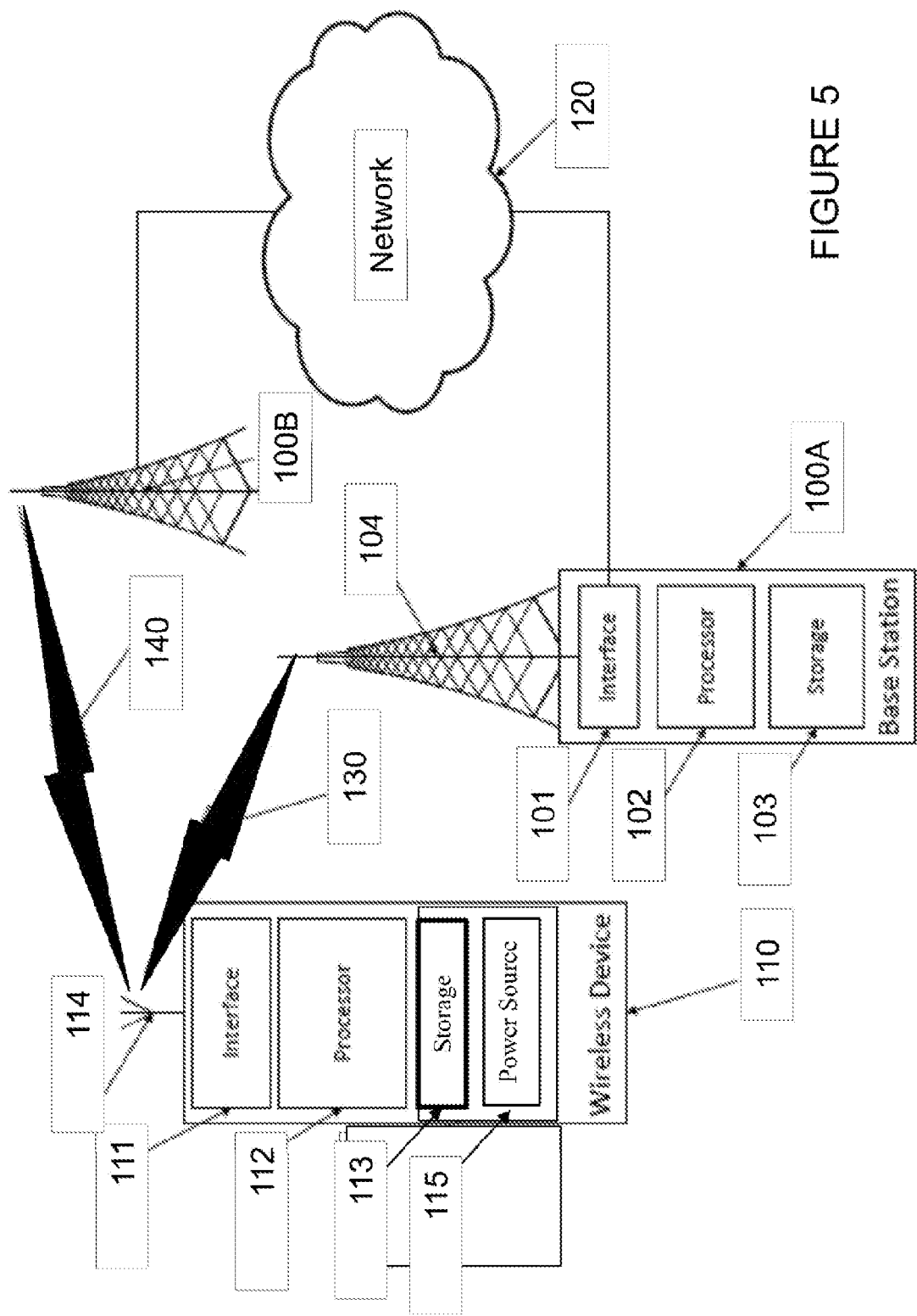
FIG. 5 is a schematic diagram of a wireless communication network, according to certain embodiments.

FIGS. 5-11 disclose a number of embodiments which provide solutions for deciding spectrum utilization. Specifically, FIG. 5 is a schematic diagram of a wireless communication network, in accordance with certain embodiments. In the illustrated embodiment, FIG. 5 includes network 120, network nodes 100A-B (network node 100A may be referenced generally as "network node 100"), and wireless device 110. In different embodiments, the wireless communication network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a NodeB, base station (BS), radio base station, multi-standard radio (MSR) radio node such as MSR BS, eNodeB, gNodeB/gNB, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor circuitry 102, storage 103, and antenna 104. These components are depicted as single boxes located within a single larger box. In practice however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and an RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB:s. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101, which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio transmitter/receiver may receive digital data that is to be sent out to other network nodes or wireless devices 110 via a wireless connection. The radio transmitter/receiver may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone, and/or vehicle or telematics unit in a vehicle, which is able to wirelessly send and receive data and/or signals to and from a network node, such as network node 100 and/or other wireless devices 110. For example, wireless device 110 may transmit wireless signals to one or more of network nodes 100a-b, and/or receive wireless signals from one or more of network nodes 100a-b. The wireless signals may contain voice traffic, data traffic, control signals, and/or any other suitable information. In some embodiments, an area of wireless signal coverage associated with a network node 100 may be referred to as a cell. In some embodiments, wireless device 110 may have device-to-device (D2D) capability. Thus, wireless device 110 may be able to receive signals from and/or transmit signals directly to another wireless device.

Wireless device 110 comprises interface 111, processing circuitry 112, storage 113, antenna 114, and power source 115. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or apart of antenna 114. The radio transmitter and/or receiver may receive digital data that is to be sent out to network node 100 via a wireless connection. The radio transmitter and/or receiver may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Power source 115 may comprise power management circuitry. Power source 115 may receive power from a power supply, which may either be comprised in, or be external to, power source 115. For example, wireless device 110 may comprise a power supply in the form of a battery or battery pack, which is connected to, or integrated in, power source 11S. Other types of power sources, such as photovoltaic devices, may also be used. As a further example, wireless device 110 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 110 with power for performing the functionality described herein.

Figure 10:
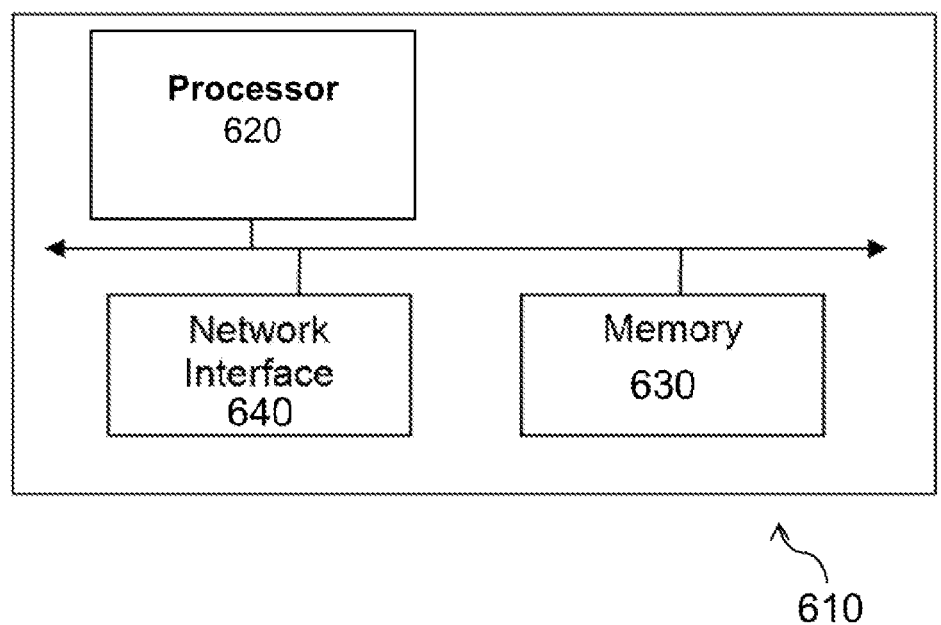
FIG. 10 is a schematic block diagram of an exemplary radio network controller or core network node, in accordance with certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 10 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In non-access stratum signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 5 illustrates a particular arrangement of a wireless communication network, the present disclosure contemplates that the various embodiments described herein may be applied to a variety of networks having any suitable configuration. For example, the wireless communication network may include any suitable number of wireless devices 110 and network nodes 100, as well as any additional elements suitable to support communication between wireless devices or between a wireless device and another communication device (such as a landline telephone). Furthermore, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, 5G, LTE, LTE-Advanced, UMTS, HSPA, GSM, cdma2000, WiMax, WiFi, or any other suitable radio access technology.

Figure 6:
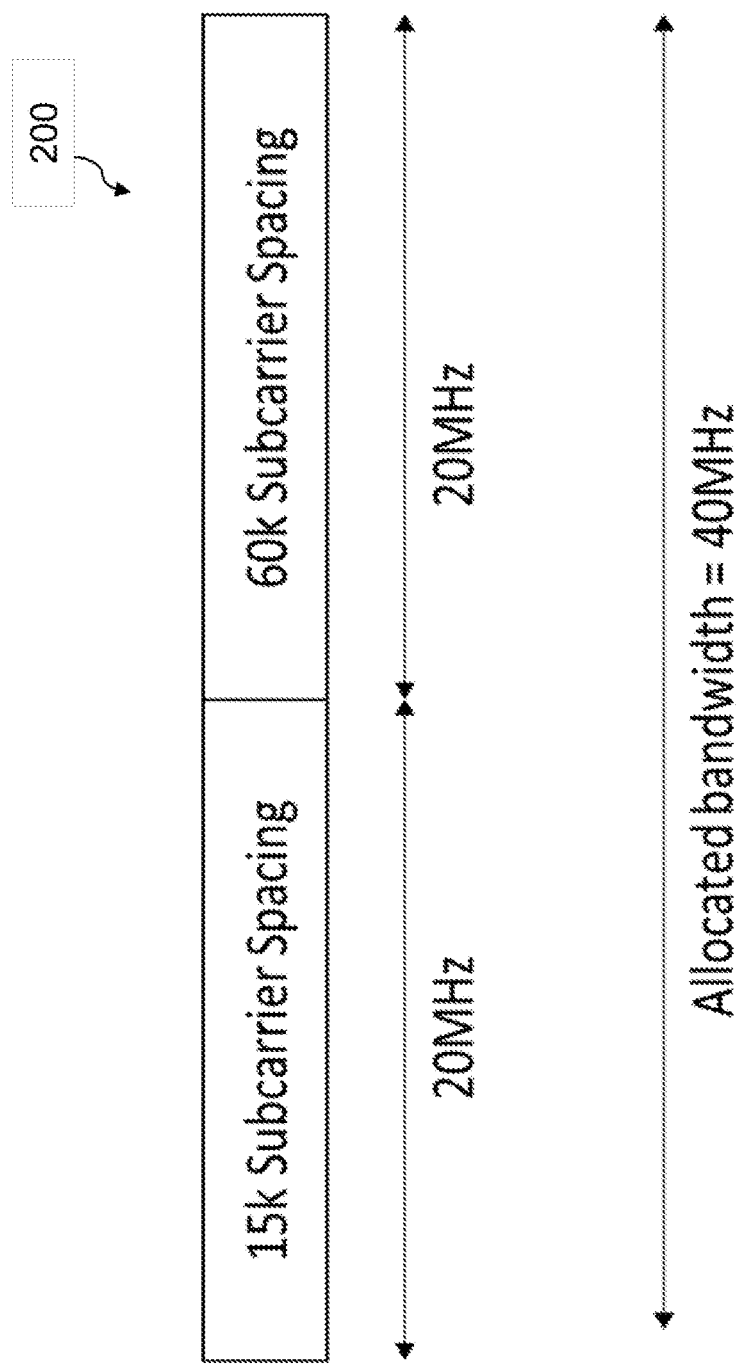
FIG. 6 is an example transmission utilizing multiple numerologies, according to certain embodiments.

As explained above, embodiments of the present disclosure describe systems and methods for determining and improving spectrum utilization for transmission of multiple numerologies. FIG. 6 is an example transmission 200 utilizing multiple numerologies, according to certain embodiments. In the depicted example, a wireless device 110 or a network node 100 (e.g., a gNB) is allocated a 40 MHz carrier. Wireless device 110 or Network node 100 may transmit two numerologies for a certain transmission time interval (TTI). In the example of FIG. 6, half of the bandwidth is allocated to each numerology. One numerology is based on the 15 khz subcarrier spacing and the second numerology on the 60 khz subcarrier spacing.

The spectrum utilization decided for each numerology is examined. For the 15 khz subcarrier spacing, 216 PRBs may be used. This corresponds to a percentage spectral utilization of 97.2%. For the 60 khz subcarrier spacing, 51 PRBs may be used. This corresponds to a percentage spectral utilization of 91.8%. The 91.8% from the 60 khz subcarrier spacing is the lower of the two and is thus used as the basis for the spectrum utilization. For the 60 khz SCS, the amount of used PRBs is shown by equation 1:

$$\lfloor 40\ \text{MHz} * 50\% * 91.8\% / 60\ \text{khz} * 12 \rfloor = 25 \quad \text{(Eq. 1)}$$

For the 15 khz SCS, the amount of used PRBs is shown by equation 2:

$$\lfloor 40\ \text{MHz} * 50\% * 91.8\% / 15\ \text{khz} * 12 \rfloor = 102 \quad \text{(Eq. 2)}$$

At a later stage, the wireless device or the gNB decides to allocate 75% of the bandwidth to the 15 khz SCS and 25% to the 60 khz SCS. For the 60 khz SCS, the amount of used PRBs is shown by equation 3:

$$\lfloor 40\ \text{MHz} * 25\% * 91.8\% / 60\ \text{khz} * 12 \rfloor = 12 \quad \text{(Eq. 3)}$$

For the 15 khz SCS, the amount of used PRBs is shown by equation 4:

$$\lfloor 40\ \text{MHz} * 75\% * 91.8\% / 15\ \text{khz} / 12 \rfloor = 153 \quad \text{(Eq. 4)}$$

Figure 7:
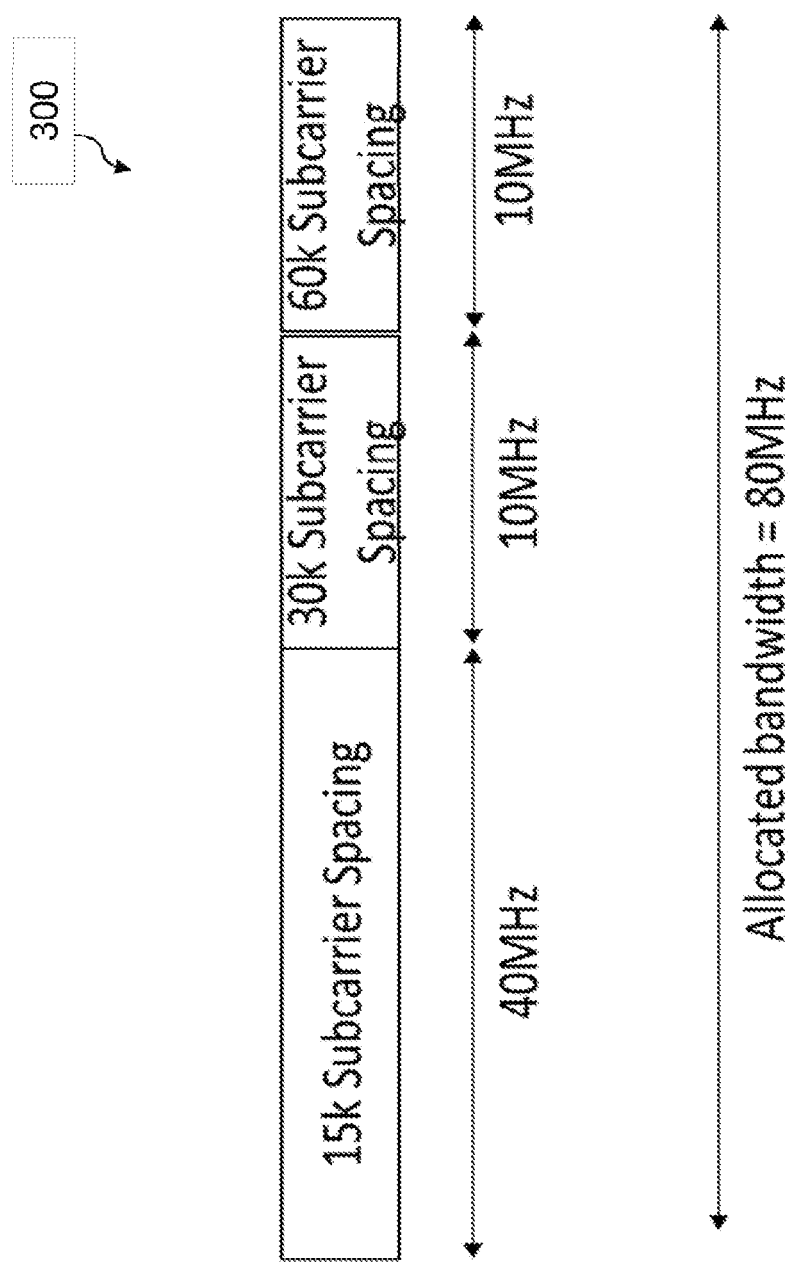
FIG. 7 is another example transmission utilizing multiple numerologies, according to certain embodiments.

FIG. 7 is another example transmission 300 utilizing multiple numerologies, according to certain embodiments. In the depicted example, network node 100 (e.g., a gNB) may transmit three numerologies within an 80 MHz bandwidth: 15 khz, 30 khz and 60 khz. In the illustrated embodiment, only the 15 khz and 60 khz numerologies are near to the edge of the bandwidth and thus only these numerologies are considered. In an 80 MHz bandwidth, the percentage spectral utilizations are 96.3% for the 60 khz SCS and is not defined for the 15 khz SCS. Thus 96.3% defined for 60 khz SCS can be used as the basis for the spectral utilization in this case, since the largest SCS will be the one that implies the lowest spectral utilization Network node 100 may allocate 50% of the bandwidth to the 15 khz numerology and 25% each to the 30 and 60 khz numerologies. For the 60 khz SCS, the amount of used PRBs is shown by equation 5:

$$\lfloor 180\ \text{MHz} * 25\% * 97.2\% / 60\ \text{khz} * 12 \rfloor = 27 \quad \text{(Eq. 5)}$$

For the 30 khz SCS, the amount of used PRBs is shown by equation 6:

$$\lfloor 80\ \text{MHz} * 25\% * 97.2\% / 30\ \text{khz} * 12 \rfloor = 54 \quad \text{(Eq. 6)}$$

For the 15 khz SCS, the amount of used PRBs is shown by equation 7:

$$\lfloor 80\ \text{MHz} * 50\% * 97.2\% / 15\ \text{khz} * 12 \rfloor = 216 \quad \text{(Eq. 7)}$$

Figure 8:
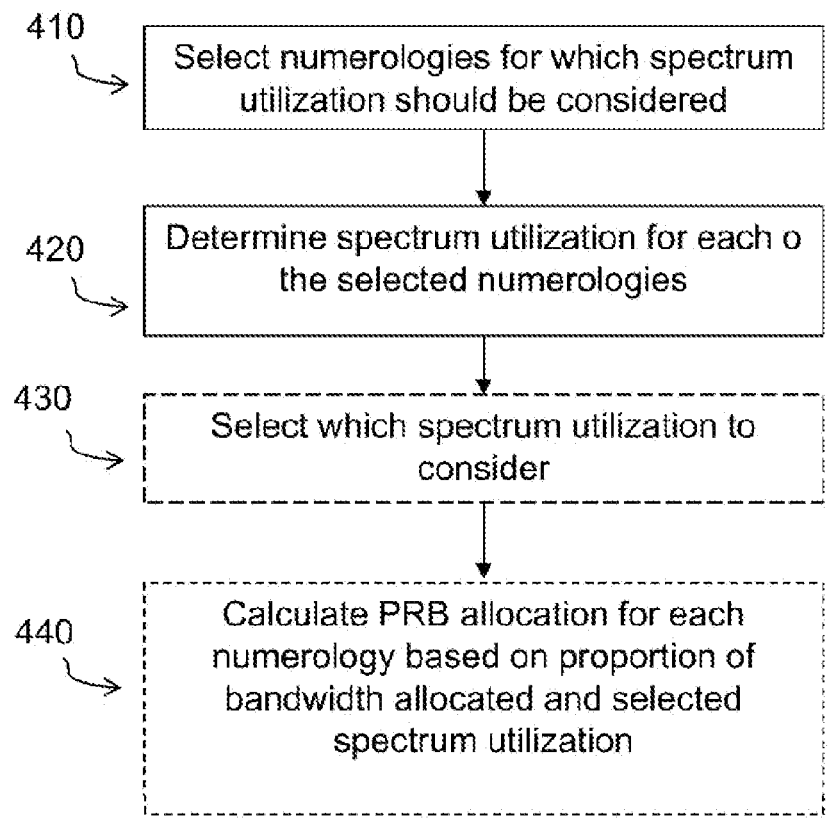
FIG. 8 is an example flowchart for determining spectrum utilization, according to certain embodiments.

FIG. 8 illustrates an example flow chart for determining spectrum utilization, according to certain embodiments. At step 410, an apparatus such as network node 100A, wireless device 110, or another transmitter may select the numerologies for which spectrum utilizing may be considered. At step 420, the apparatus may determine (e.g., calculate) the spectrum utilization for each of the selected numerologies. At step 430, the apparatus may select which spectrum utilization to consider for communications. At step 440, the apparatus may calculate a PRB allocation for each numerology based on the proportion of bandwidth allocated and selected spectrum utilization. In some embodiments, the apparatus may then communicate with a receiving apparatus using the selected spectrum utilization and PRB allocation.

Figure 9:
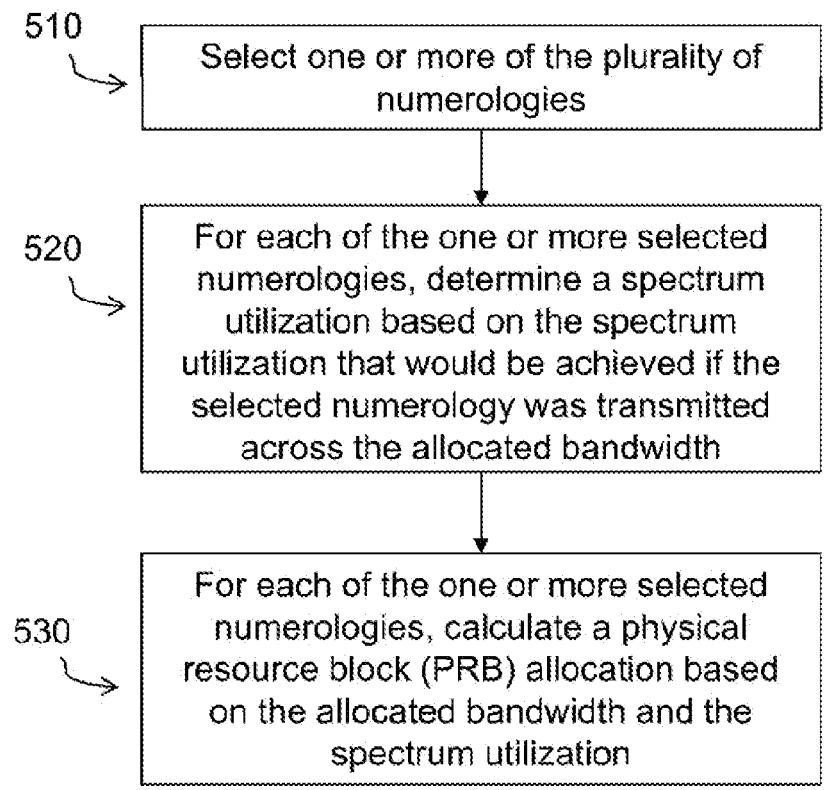
FIG. 9 is an example flowchart for determining spectrum utilization, according to certain embodiments.

FIG. 9 illustrates another example flow chart for determining spectrum utilization, according to certain embodiments. The method begins at step 510 with an apparatus such as network node 100A, wireless device 110, or another transmitter selecting one or more of the plurality of numerologies. In a particular embodiment, the numerologies that are selected may be transmitted at either edge of the allocated bandwidth.

At step 520, the apparatus determines a spectrum utilization for each of the one or more selected numerologies. The spectrum utilization is based on the spectrum utilization that would be achieved if the selected numerology was transmitted across the allocated bandwidth. In a particular embodiment, the spectrum utilization may be determined based on information received from another node and/or based on the application of a rule.

In a particular embodiment, the spectrum utilization is used for user data and comprises a first amount of bandwidth within the allocated bandwidth. A second amount of bandwidth within the allocated bandwidth is unused. In a particular embodiment, a portion of the second amount of bandwidth is disposed on each side of the first amount of bandwidth to operate as a guard between two adjacent numerologies. The second amount of bandwidth may be determined based on the first amount of bandwidth.

In a particular embodiment, a predefined spectrum utilization may be used. The predefined spectrum utilization may be based on one of a higher predefined bandwidth and a lower predefined bandwidth. In another embodiment, an interpolated spectrum utilization may be used. The interpolated spectrum utilization may be based on a position of the allocated bandwidth compared to a predefined lower bandwidth and a predefined higher bandwidth.

At step 530, a PRB allocation is calculated for each of the one numerologies. The PRB allocation is based on the allocated bandwidth and the spectrum utilization. In a particular embodiment, the PRB allocation may be rounded down to the nearest PRB.

In a particular embodiment, for example, a spectrum utilization from the spectrum utilizations determined for the one or more numerologies at step 520 may be selected. The selected spectrum utilization may then be used as for calculating the PRB allocation. As just one example, the selected spectrum utilization may be the lowest spectrum utilization of the spectrum utilizations determined for the one or more numerologies.

FIG. 10 is a schematic block diagram of an exemplary radio network controller or core network node 610, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 610 includes processor 620, memory 630, and network interface 640. In some embodiments, processor 620 executes instructions to provide some or all of the functionality described above as being provided by the network node, memory 630 stores the instructions executed by processor 620, and network interface 640 communicates signals to any suitable node, such as a gateway, switch, router, Internet, Public Switched Telephone Network (PSTN), network nodes 100, radio network controllers or core network nodes 610, etc.

Processor 620 may include any suitable combination of hardware and software implemented in one or more modules to execute instructions and manipulate data to perform some or all of the described functions of the radio network controller or core network node 610. In some embodiments, processor 620 may include, for example, one or more computers, one or more central processing units (CPUs), one or more microprocessors, one or more applications, and % or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the embodiments described above).

Figure 11:
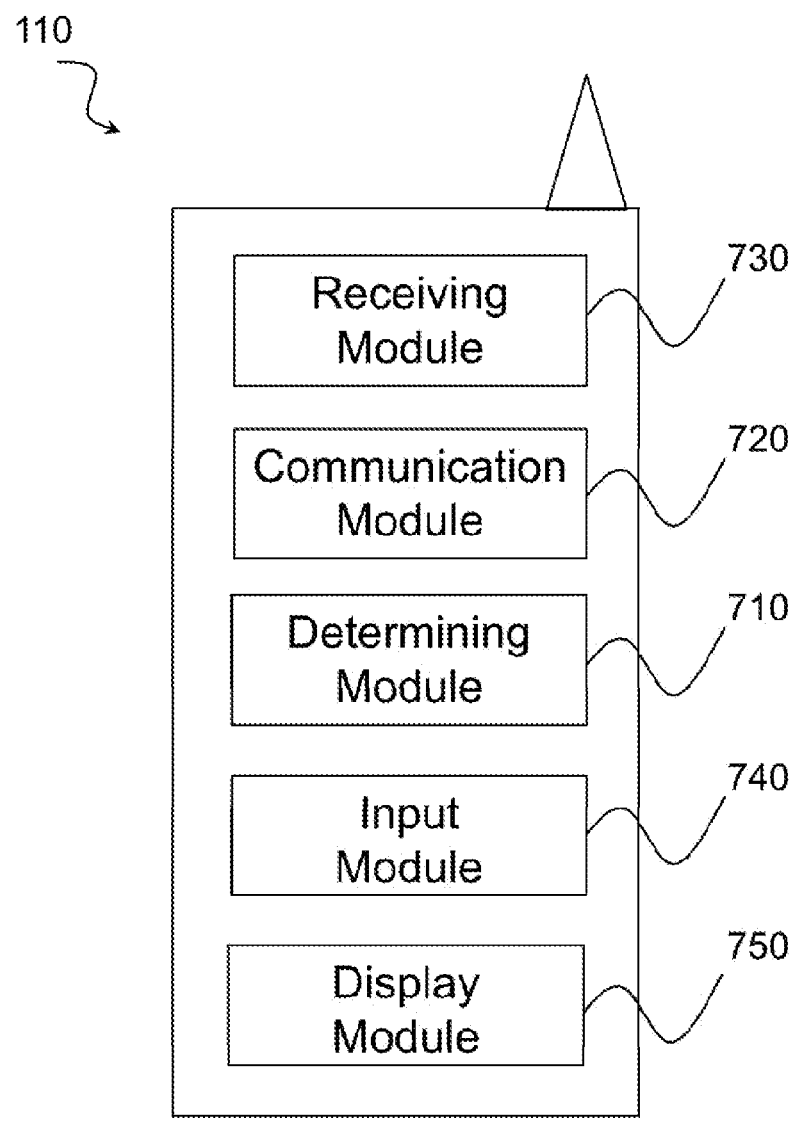
FIG. 11 is a schematic block diagram of an exemplary wireless device, in accordance with certain embodiments.

FIG. 11 is a schematic block diagram of an exemplary wireless device 110, in accordance with certain embodiments. Wireless device 110 may include one or more modules. For example, wireless device 110 may include a determining module 710, a communication module 720, and a receiving module 730. Optionally, wireless device 110 may include an input module 740, a display module 750, and any other suitable modules. Wireless device 110 may perform any of the functions described above in regard to FIGS. 1-10.

Determining module 710 may perform the processing functions of wireless device 110. In certain embodiments, wireless device 110 may perform any of the functions described above with respect to FIGS. 1-10. Determining module 710 may include or be included in one or more processors, such as processor 112 described above in relation to FIG. 5. Determining module 710 may include analog and/or digital circuitry configured to perform any of the functions of determining module 710 and/or processor 112 described above. In one embodiment, for example, determining module 710 may select one or more of the plurality of numerologies. For each of the one or more selected numerologies, determining module 710 may determine a spectrum utilization based on the spectrum utilization that would be achieved if the selected numerology was transmitted across the allocated bandwidth. Determining module 710 may then calculate a PRB allocation based on the allocated bandwidth and the spectrum utilization. The functions of determining module 710 described above may, in certain embodiments, be performed in one or more distinct modules.

Communication module 720 may perform the communication functions of wireless device 110. In certain embodiments, communication module 720 may perform any of the communication functions described above with respect to FIGS. 1-10. Communication module 720 may transmit messages to one or more of network nodes 100a-b of the wireless network described in FIG. 5. Communication module 720 may include a transmitter and/or a transceiver, such as interface 111 and/or antenna 114 described above in relation to FIG. 5. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of wireless device 110. In certain embodiments, receiving module 730 may perform any of the receiving functions of wireless device 110 described above with respect to FIGS. 1-10. Receiving module 730 may include a receiver and/or a transceiver, such as interface 111 and/or antenna 114 described above in relation to FIG. 5. Receiving module 730 may include circuitry configured to wirelessly receive messages and/or signals. In particular embodiments, receiving module 730 may communicate received messages and/or signals to determining module 710.

Optionally, wireless device 110 may include input module 740. Input module 740 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710.

Optionally, wireless device 110 may include display module 750. Display module 750 may present signals on a display of wireless device 110. Display module 750 may include the display and/or any appropriate circuitry and hardware configured to present signals on the display. Display module 750 may receive signals to present on the display from determining module 710.

Determining module 710, communication module 720, receiving module 730, input module 740, and display module 750 may include any suitable configuration of hardware and/or software, such as all being implemented as hardware or all being implemented with the help of software. Wireless device 110 may include additional modules beyond those shown in FIG. 11 that may be responsible for providing any suitable functionality, including any of the functionality described above and/or any additional functionality (including any functionality necessary to support the various solutions described herein).

Figure 12:
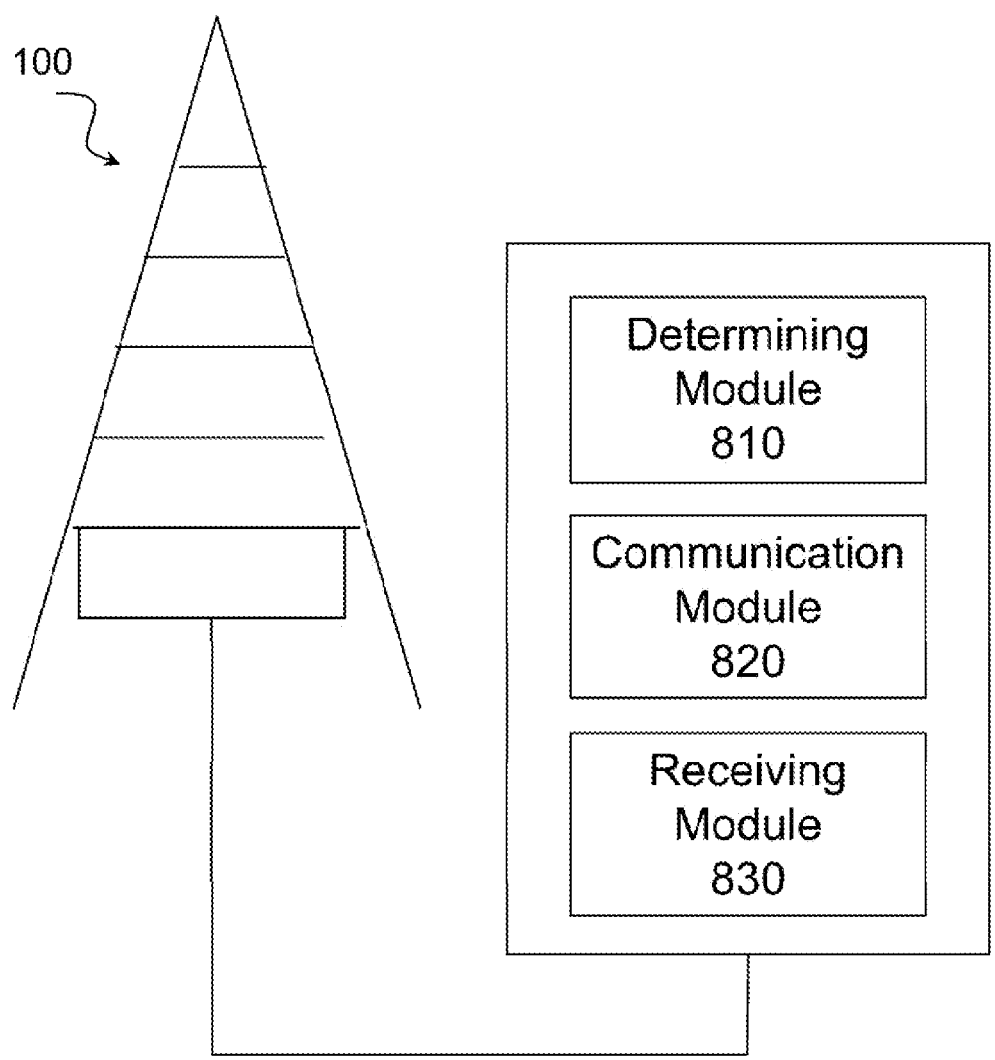
FIG. 12 is a schematic block diagram of an exemplary network node, in accordance with certain embodiments.

FIG. 12 is a block schematic of an exemplary network node 100, in accordance with certain embodiments. Network node 100 may include one or more modules. For example, network node 100 may include determining module 810, communication module 820, receiving module 830, and any other suitable modules. In some embodiments, one or more of determining module 810, communication module 820, receiving module 830, or any other suitable module may be implemented using one or more processors, such as processor 102 described above in relation to FIGURE S. In certain embodiments, the functions of two or more of the various modules may be combined into a single module. Network node 100 may perform one or more steps associated with the embodiments described above in reference to FIGS. 1-10.

Determining module 810 may perform the processing functions of network node 100. In certain embodiments, determining module 810 may perform any of the functions of network node described above with respect to FIGS. 1-10. In one example embodiment, determining module 810 may determine one or more beams for configuring wireless device 110 to switch to as part of a beam-switching procedure.

Determining module 810 may include or be included in one or more processors, such as processor 102 described above in relation to FIG. 1. Determining module 810 may include analog and/or digital circuitry configured to perform any of the functions of determining module 810 and/or processor 102 described above. In one embodiment, determining module 810 may determine a plurality of numerologies for which spectrum utilization should be considered. Determining module 810 may then determine the spectrum utilization for each of the selected numerologies and select which spectrum utilization to consider. Determining module 810 may then calculate a PRB allocation for each numerology based on the proportion of bandwidth allocated and the selected spectrum utilization.

In another embodiment, determining module 810 may select one or more of the plurality of numerologies. For each of the one or more selected numerologies, determining module 810 may determine a spectrum utilization based on the spectrum utilization that would be achieved if the selected numerology was transmitted across the allocated bandwidth. Determining module 810 may then calculate a PRB allocation based on the allocated bandwidth and the spectrum utilization.

The functions of determining module 810 may, in certain embodiments, be performed in one or more distinct modules. For example, in certain embodiments some of the functionality of determining module 810 may be performed by an allocation module.

Communication module 820 may perform the transmission functions of network node 100. In certain embodiments, network node 100 may perform any of the functions of the node described above with respect to FIGS. 1-10. In one example embodiment, communication module 820 may communication with wireless device 110 using the PRB allocation and selected spectrum utilization determined by determining module 810.

Communication module 820 may transmit messages to one or more of wireless devices 110. Communication module 820 may include a transmitter and/or a transceiver, such as interface 101 described above in relation to FIG. 5. Communication module 820 may include circuitry configured to wirelessly transmit messages and/or signals. In particular embodiments, communication module 820 may receive messages and/or signals for transmission from determining module 810 or any other module.

Receiving module 830 may perform the receiving functions of network node 100. In certain embodiments, receiving module 830 may perform any of the functions of network node 100 described in FIGS. 1-10. Receiving module 830 may receive any suitable information from wireless device 110 Receiving module 830 may include a receiver and/or a transceiver, such as interface 101 and/or antenna 104, which are described above in relation to FIG. 5. Receiving module 830 may include circuitry configured to wirelessly receive messages and/or signals. In particular embodiments, receiving module 830 may communicate received messages and/or signals to determining module 810 or any other suitable module.

Determining module 810, communication module 820, and receiving module 830 may include any suitable configuration of hardware and/or software, such as all being implemented as hardware or all being implemented with the help of software. Network node 100 may include additional modules beyond those shown in FIG. 12 that may be responsible for providing any suitable functionality, including any of the functionality described above and/or any additional functionality (including any functionality necessary to support the various embodiments described herein).

According to certain embodiments, a method in a network node for determining spectrum utilization for a plurality of numerologies transmitted within an allocated bandwidth includes selecting one or more of the plurality of numerologies. For each of the one or more selected numerologies, a spectrum utilization is determined. The spectrum utilization is based on the spectrum utilization that would be achieved if the selected numerology was transmitted across the allocated bandwidth. A physical resource block (PRB) allocation is calculated based on the allocated bandwidth and the spectrum utilization. The one of the one or more of the plurality of numerologies are implemented within the allocated bandwidth.

In a particular embodiment, selecting one or more of the plurality of numerologies comprises selecting one or more numerologies that are transmitted at either edge of the allocated bandwidth.

In a particular embodiment, the implemented numerology is the numerology that requires the lowest determined spectrum utilization.

In a particular embodiment, calculating the PRB allocation comprises rounding the PRB allocation down to the nearest PRB.

In a particular embodiment, determining the spectrum utilization further comprises using a predefined spectrum utilization, wherein the predefined spectrum utilization is based on one of a higher predefined bandwidth and a lower predefined bandwidth.

In a particular embodiment, determining the spectrum utilization further comprises using an interpolated spectrum utilization, wherein the interpolated spectrum utilization is based on a position of the allocated bandwidth compared to a predefined lower bandwidth and a predefined higher bandwidth.

According to certain embodiments, an example network node for determining spectrum utilization for a plurality of numerologies transmitted within an allocated bandwidth includes processing circuitry configured to select one or more of the plurality of numerologies. For each of the one or more selected numerologies, a spectrum utilization is determined based on the spectrum utilization that would be achieved if the selected numerology was transmitted across the allocated bandwidth. A physical resource block (PRB) allocation is calculated based on the allocated bandwidth and the spectrum utilization. The one of the one or more of the plurality of numerologies are implemented within the allocated bandwidth.

In a particular embodiment, to select one or more of the plurality of numerologies, the processing circuitry is configured to select one or more numerologies that are transmitted at either edge of the allocated bandwidth.

In a particular embodiment, the implemented numerology is the numerology that requires the lowest determined spectrum utilization.

In a particular embodiment, to calculate the PRB allocation, the processing circuitry is configured to round the PRB allocation down to the nearest PRB.

In a particular embodiment, to determine the spectrum utilization, the processing circuitry is further configured to use a predefined spectrum utilization, wherein the predefined spectrum utilization is based on one of a higher predefined bandwidth and a lower predefined bandwidth.

In a particular embodiment, to determine the spectrum utilization, the processing circuitry is further configured to use an interpolated spectrum utilization based on a position of the allocated bandwidth compared to a predefined lower bandwidth and a predefined higher bandwidth.

According to certain embodiments, a computer program product in the form of storage (113, 103) comprising a non-transitory computer readable medium storing computer readable program code is provided, the computer readable program code operable, when executed by processing circuitry to perform any of the described above.

According to certain embodiments, the method/processing circuitry/program code determining spectrum utilization, is based on information received from another node, and/or a based on the application of a rule.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| Abbreviation | Explanation |
| --- | --- |
| 3GPP | 3$^{rd}$ Generation Partnership Project |
| ACS | Adjacent Channel Selectivity |
| CP | Cyclic Prefix |
| D2D | Device to Device |
| E-UTRA | Enhanced Universal Terrestrial Radio Access |
| GHz | Giga-Hertz |
| gNB | 5G Node B |
| KHz | Kilo-Hertz |
| LTE | Long Term Evolution |
| MBB | Mobile Broadband |
| MHz | Mega-Hertz |
| MTC | Machine Type Communication |
| NR | New Radio |
| OFDM | Orthogonal Frequency Division Multiplexing |
| PRB | Physical Resource Blocks |
| RAT | Radio Access Technology |
| SCS | Subcarrier Spacing |
| TTI | Transmission Time Interval |
| URLLC | Ultra Reliable Low Latency Communication |
| USEC | Micro Seconds |

| Abbreviation | Explanation |
| --- | --- |
| UTRA | Universal Terrestrial Radio Access |
| V2V | Vehicle to Vehicle |
| V2X | Vehicle to Infrastructure |

The invention claimed is:

1. A method for determining spectrum utilization for a plurality of numerologies transmitted within an allocated bandwidth, the method comprising:
   selecting numerologies that are transmitted at either edge of the allocated bandwidth;
   determining, for each of the selected numerologies, a spectrum utilization, wherein the spectrum utilization is based on the spectrum utilization that would be achieved if the selected numerology was transmitted in isolation across the entire allocated bandwidth;
   determining a lowest spectrum utilization from the spectrum utilizations determined for the selected numerologies to be the basis of a spectrum utilization used for calculating a physical resource block, PRB, allocation; and
   selecting the PRB allocation, wherein the PRB allocation is based on the allocated bandwidth and the determined lowest spectrum utilization.

2. The method of claim 1, wherein:
   the spectrum utilization comprises a first amount of bandwidth within the allocated bandwidth for user data, and
   a second amount of bandwidth within the allocated bandwidth which is unused.

3. The method of claim 2, wherein a portion of the second amount of bandwidth is disposed on each side of the first amount of bandwidth to operate as a guard between bandwidth allocations.

4. The method of claim 2, wherein the second amount of bandwidth is determined based on the first amount of bandwidth.

5. The method of claim 1, wherein calculating the PRB allocation comprises rounding the PRB allocation down to the nearest PRB.

6. The method of claim 1, wherein the method is performed by a network node.

7. The method of claim 1, wherein the method is performed by a wireless device.

8. An apparatus for determining spectrum utilization for a plurality of numerologies transmitted within an allocated bandwidth, the network node comprising:
   processing circuitry configured to:
   select numerologies that are transmitted at either edge of the allocated bandwidth;
   determine, for each of the selected numerologies, a spectrum utilization, wherein the spectrum utilization is based on the spectrum utilization that would be achieved if the selected numerology was transmitted in isolation across the entire allocated bandwidth;
   determine a lowest spectrum utilization from the spectrum utilizations determined for the selected numerologies to be the basis of a spectrum utilization used for calculating a physical resource block, PRB, allocation; and
   select the PRB allocation, wherein the PRB allocation is based on the allocated bandwidth and the determined lowest spectrum utilization.

9. The apparatus of claim 8, wherein:
   the spectrum utilization is used for user data and comprises a first amount of bandwidth within the allocated bandwidth, and
   a second amount of bandwidth within the allocated bandwidth is unused.

10. The apparatus of claim 9, wherein a portion of the second amount of bandwidth is disposed on each side of the first amount of bandwidth to operate as a guard between bandwidth allocations.

11. The apparatus of claim 9, wherein the second amount of bandwidth is determined based on the first amount of bandwidth.

12. The apparatus of claim 8, wherein to calculate the PRB allocation the processing circuitry is configured to round the PRB allocation down to the nearest PRB.

13. The apparatus of claim 8, wherein to determine the spectrum utilization the processing circuitry is further configured to use a predefined spectrum utilization, wherein the predefined spectrum utilization is based on one of a higher predefined bandwidth and a lower predefined bandwidth.

14. The apparatus of claim 8, wherein the processing circuitry is configured to:
   for each of the one or more selected numerologies, determine an amount of unused bandwidth on either side of the respective numerologies based on the spectrum utilization.

15. The apparatus of claim 8, wherein the PRB allocation is based on a proportion of the allocated bandwidth.

16. The apparatus of claim 8, wherein to determine the spectrum utilization the processing circuitry is further configured to use an interpolated spectrum utilization, wherein the interpolated spectrum utilization is based on a position of the allocated bandwidth compared to a predefined lower bandwidth and a predefined higher bandwidth.

17. The apparatus of claim 8, wherein the spectrum utilization is determined based on information received from another node and/or based on the application of a rule.

18. The apparatus of claim 8, wherein the apparatus comprises a network node.

19. The apparatus of claim 8, wherein the apparatus comprises a wireless device.

20. A computer program product in the form of storage comprising a non-transitory computer readable medium storing computer readable program code, the computer readable program code operable, when executed by an apparatus to perform the method of claim 1.

* * * * *

UNITED STATES PATENT AND TRADEMARK OFFICE
CERTIFICATE OF CORRECTION

PATENT NO. : 11,582,010 B2
APPLICATION NO. : 16/330250
DATED : February 14, 2023
INVENTOR(S) : Chapman et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 1, Line 5, delete "Teh" and insert -- The --, therefor.

In the Specification

In Column 1, Line 8, delete "PCT/EP20181072101" and insert -- PCT/EP2018/072101 --, therefor.

In Column 2, Line 30, delete "MRR (Mobile Broadband)," and insert -- MBB (Mobile Broadband), --, therefor.

In Column 2, Line 40, delete "F-UTRA" and insert -- E-UTRA --, therefor.

In Column 2, Line 42, delete "(201743-23)" and insert -- (2017-03-23). --, therefor.

In Column 8, Line 10, delete "to or apart" and insert -- to or a part --, therefor.

In Column 8, Lines 50-51, delete "power source 11S." and insert -- power source 115. --, therefor.

In Column 10, Line 37, in Equation (5), delete "⌊180 MHz*25%*97.2%/60 khz*12⌋=27" and insert -- ⌊80 MHz*25%*97.2%/60 khz*12⌋=27 --, therefor.

In Column 11, Lines 63-64, delete "and % or" and insert -- and/or --, therefor.

In Column 12, Line 66, delete "interface Ill" and insert -- interface 111 --, therefor.

In Column 13, Line 55, delete "FIGURE S." and insert -- FIG. 5. --, therefor.

In Column 14, Lines 34-35, delete "may communication" and insert -- may communicate --, therefor.

Signed and Sealed this
Second Day of April, 2024

Katherine Kelly Vidal
*Director of the United States Patent and Trademark Office*

CERTIFICATE OF CORRECTION (continued)
U.S. Pat. No. 11,582,010 B2

In Column 16, Line 12, delete "and/or a based" and insert -- and/or is based --, therefor.

In the Claims

In Column 17, Line 51, in Claim 8, delete "the network node" and insert -- a network node --, therefor.